United States Patent
Jänker

(10) Patent No.: US 6,328,019 B1
(45) Date of Patent: Dec. 11, 2001

(54) DEVICE AND CONSTANT CONTROL OF PIEZOELECTRIC ACTUATORS FOR FUEL INJECTION SYSTEMS

(75) Inventor: Peter Jänker, Garching (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/582,393

(22) PCT Filed: Oct. 12, 1999

(86) PCT No.: PCT/DE99/03275

§ 371 Date: Aug. 18, 2000

§ 102(e) Date: Aug. 18, 2000

(87) PCT Pub. No.: WO00/25020

PCT Pub. Date: May 4, 2000

(30) Foreign Application Priority Data

Oct. 23, 1998 (DE) .............................. 198 48 950

(51) Int. Cl.$^7$ .................................................. F02M 33/04
(52) U.S. Cl. ............................................................ 123/498
(58) Field of Search ...................................... 123/497, 498

(56) References Cited

U.S. PATENT DOCUMENTS 4,732,129  3/1988  Masahiro et al. .
4,750,706 *  6/1988  Schlagmuller .................. 251/129.06
6,236,190 *  5/2001  Hoffman et al. ....................... 320/166

FOREIGN PATENT DOCUMENTS

| 195 31 652 | 5/1977 | (DE) . |
| 196 44 521 | 4/1998 | (DE) . |
| 197 14 610 | 10/1998 | (DE) . |
| 0 856 654 | 8/1998 | (EP) . |
| WO 94/18449 | 8/1994 | (WO) . |

* cited by examiner

*Primary Examiner*—Thomas N. Moulis
(74) *Attorney, Agent, or Firm*—Kenyon & Kenyon

(57) ABSTRACT

A device directed to a continuous control of piezoelectric actuators for fuel injection systems. A piezoelectric actuator is provided for controlling the valves of i.c. engines with a constant actuator function under different conditions of use and operation. The electrical manipulated variable is a length-changing electrical charge transmitted to the piezo stack that is generated by a charge generator and is controlled in reference to the charge by a control unit. The use and operation conditions of the i.c. engine acting on the piezo actuator are detected by sensors and fed to the control unit to parameterize the charge control. With these features, a continuous control of a piezoelectric actuator in a fuel injection system for i.c. engines is achieved, in which the length of its piezo stack can be changed with an electrical manipulated variable to actuate a fuel valve in the injection system

3 Claims, 1 Drawing Sheet

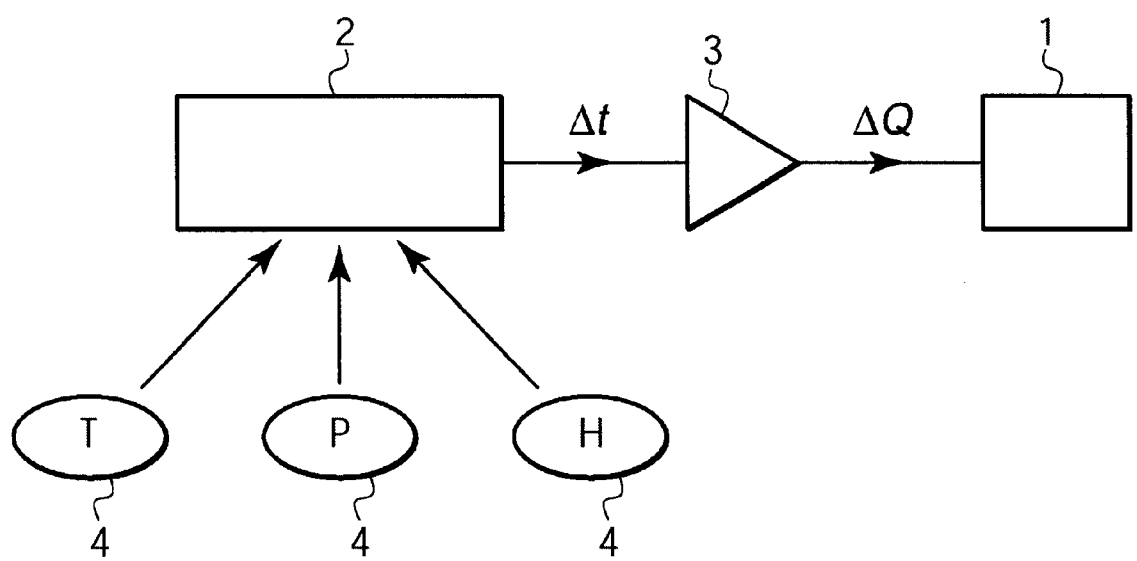

DEVICE AND CONSTANT CONTROL OF PIEZOELECTRIC ACTUATORS FOR FUEL INJECTION SYSTEMS

BACKGROUND INFORMATION

The present invention concerns a device directed to a continuous control of a piezoelectric actuator for fuel injection systems.

To control fuel injection valves for internal combustion engines, previously proposed systems, as described in German Published Patent Application No. 195 31 652, use piezoelectric actuators whose piezo stack, that changes in length in response to an electrical control voltage, serves to actuate the valve element. With piezoelectric actuators, a pronounced hysteresis effect arise between the electrical voltage applied to the piezo stack that receives the electrical charge and the generated elongation of the piezo stack during the operating cycle. Due to this dielectric hysteresis, the high precision in the set movements of the fuel injection valves from piezoelectric actuators cannot be maintained.

Furthermore, it is difficult to continuous control the actuators due to alternating conditions of use and operation of i.c. engines such as load and temperature, and to the ageing of the piezo stack.

SUMMARY OF THE INVENTION

It is an object of the present invention to create a piezoelectric actuator to control valves of i.c. engines with a constant actuator function under different conditions of use and operation.

This object is solved according to the invention by the features of patent claim 1. Developments of the invention are found in the subclaims.

The hysteresis only arises between the received electrical charge and an electrical voltage that cause the charge to be received.

The elongation curve $S(Q)$—where S stands for the relative elongation of the ceramic and Q stands for the electrical charge received by the ceramic—can be expressed by a mathematical function that follows a quadratic equation $S=a\ (Q-Q_o)^2$.

Given these facts, a procedure is suggested according to the present invention that advantageously keeps constant the thrust function of a piezoelectric actuator by precisely controlling the receipt of the electrical charge, The influence of external mechanical and/or thermal quantities on the actuator such as the fuel pressure and engine temperature are advantageously eliminated according to the present invention since they are detected via sensors and are entered as parameters in the actuator control. Such sensors are common in modern engine control. The ageing of the piezo actuator can be compensated by measuring the operating hours with sensors.

BRIEF DESCRIPTION OF THE DRAWINGS

The FIGURE shows a device to continuous control a piezoelectric actuator in a block diagram.

The device in the FIGURE consists of a piezo actuator 1, a control unit 2, a charge generator 3 and sensors 4.

DETAILED DESCRIPTION

The charge generator 3 transfers a charge $\Delta Q$ set by the control unit 2 that changes the length of the piezo stack (not shown it the block diagram) of the piezo actuator I. The control unit 2 calculates the charge from a typical elongation curve $S=a\ (Q-Q_o)^2$ of the used piezo stack in non-volatile storage in the control unit 2. In addition, the current use and operating conditions of the i.c. engine are detected by sensors 4 and fed to the control unit in which they are used for computer-supported parameterization of the elongation curve. In the exemplary embodiment, the engine temperature T, the fuel pressure P and the operating hours h are measured as use and operating conditions, In the shown exemplary embodiment, the charge generator 3 is designed as a time-controlled constant current source, The turn-on time $\Delta t$ to control the charge $\Delta Q$ emitted by the constant current source is calculated by the control unit 2 and fed to the constant current source. Instead of the constant current source, other controllable charge generators can be used that generate a specific current curve over time.

What is claimed is:

1. A device for achieving a continuous control of a piezoelectric actuator in a fuel injection system for an i.c. engine, comprising:

a control unit for parameterizing an electrical manipulated variable by which a length of a piezo stack of the piezoelectric actuator is capable of being changed in accordance with operating and use conditions of the i.c. engine; and a charge generator for generating and transmitting to the piezo stack a length-changing electrical charge, wherein:

the length-changing electrical charge corresponds to the electrical manipulated variable, and the changeable length causes an axial shift in a fuel valve in the fuel injection system.

2. The device according to claim 1, wherein:

the charge generator includes a constant current source controlled over time by the control unit.

3. The device according to claim 1, wherein:

an engine temperature, a fuel pressure, and operating hours are measured as the operating and use conditions.

* * * * *